United States Patent
Adams et al.

(10) Patent No.: US 11,002,632 B2
(45) Date of Patent: May 11, 2021

(54) MEASURING POLARIZATION EXTINCTION RATIO (PER) USING A REFERENCE MASTER TEST JUMPER (MTJ)

(71) Applicant: VIAVI SOLUTIONS INC., San Jose, CA (US)

(72) Inventors: Robert Matthew Adams, Ottawa (CA); Joshua Benjamin Julius Philipson, Ottawa (CA)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/457,269

(22) Filed: Jun. 28, 2019

(65) Prior Publication Data

US 2020/0408637 A1 Dec. 31, 2020

(51) Int. Cl.
*G01M 11/00* (2006.01)
*G01J 4/04* (2006.01)
*G02B 6/42* (2006.01)

(52) U.S. Cl.
CPC ............. *G01M 11/337* (2013.01); *G01J 4/04* (2013.01); *G02B 6/4216* (2013.01); *G01M 11/336* (2013.01)

(58) Field of Classification Search
CPC .. G01M 11/00; G01M 11/337; G01M 11/336; G01J 4/04; G02B 6/4216
USPC ........................................................ 356/367
See application file for complete search history.

(56) References Cited

U.S. PATENT DOCUMENTS

| 7,330,611 | B2 * | 2/2008 | Bull | G02B 6/2713 |
| | | | | 385/11 |
| 10,608,746 | B2 * | 3/2020 | Zhuge | H04B 10/5561 |
| 2003/0067602 | A1 * | 4/2003 | Patel | G01M 11/331 |
| | | | | 356/369 |
| 2014/0218733 | A1 * | 8/2014 | Mikhailov | G01M 11/337 |
| | | | | 356/367 |

FOREIGN PATENT DOCUMENTS

JP 2002195914 A * 7/2002

OTHER PUBLICATIONS

THOR LABS ERM100 Extinction Ratio Meter Literature, published Jan. 18, 2008. https://www.thorlabs.com/newgrouppage9.cfm?objectgroup_id=2962.*

* cited by examiner

*Primary Examiner* — Roy M Punnoose
(74) *Attorney, Agent, or Firm* — Mannava & Kang, P.C.

(57) ABSTRACT

A system for measuring a polarization extinction ratio (PER) using a reference master test jumper (MTJ) is disclosed. The system may include an optical source to transmit an optical signal via an optical fiber. The system may also include a device under test (DUT) communicatively coupled to the optical source via the optical fiber to receive the optical signal from the optical source. The system may also include an optical measurement component communicatively coupled to the device under test (DUT). In some examples, the optical fiber may be configured or initialized to be a reference master test jumper (MTJ) that minimizes inherent polarization extinction ratio (PER) of the optical fiber when measuring a polarization extinction ratio (PER) during a measurement action.

20 Claims, 5 Drawing Sheets

500

Communicatively couple an optical fiber input to an optical source that transmits a first optical signal to the optical fiber input
501

Communicatively couple an optical fiber output to an optical measurement component to measure an polarization extinction ratio (PER) of the optical fiber
502

Tune the optical source using a tuning technique based on the measured polarization extinction ratio (PER) of the optical fiber
503

Communicatively couple a device under test (DUT) to the optical fiber output and the optical measurement component so that the tuned optical source transmits a second optical signal to the optical fiber input and the device under test (DUT)
504

Measure a polarization extinction ratio (PER) of the second optical signal at the optical measurement component
505

FIG. 5

MEASURING POLARIZATION EXTINCTION RATIO (PER) USING A REFERENCE MASTER TEST JUMPER (MTJ)

TECHNICAL FIELD

This patent application is directed to optical measurement instrumentation for telecommunication networks, and more specifically, to creating a reference master test jumper for measuring polarization extinction ratio (PER).

BACKGROUND

Polarization-dependent effects often have undesirable effects in fiber-optic systems. These adverse effects may include polarization-dependent loss (PDL) in various optical components and devices. Polarization may be uncontrolled and allowed to passively drift in a network, or it may be controlled deliberately in certain cases, say, for test and measurement. In some examples, modulators, controllers, or scramblers may be used to control polarization.

High-speed modulators and polarization controllers or scramblers may operate most efficiently with input light that is linearly polarized in a particular orientation. Polarization-maintaining (PM) fibers (PMF) may be input-pigtailed to any of these devices, or optical light source, in order to know deterministic state-of-polarization (SOP) at an output fiber. However, PM fibers may not consistently maintain polarization across the distance of the fiber due a variety of circumstances, such as PM-fiber keying accuracy, etc. Measuring the PMF-related cross talk and obtaining an accurate polarization extinction ratio (PER) measurements may be important to achieve the most accurate and reliable measurements.

BRIEF DESCRIPTION OF DRAWINGS

Features of the present disclosure are illustrated by way of example and not limited in the following Figure(s), in which like numerals indicate like elements, in which:

FIG. 5 illustrates a flow chart of a method for measuring polarization extinction ratio (PER) using a reference master test jumper (MTF), according to an example.

DETAILED DESCRIPTION

Figure 1A:
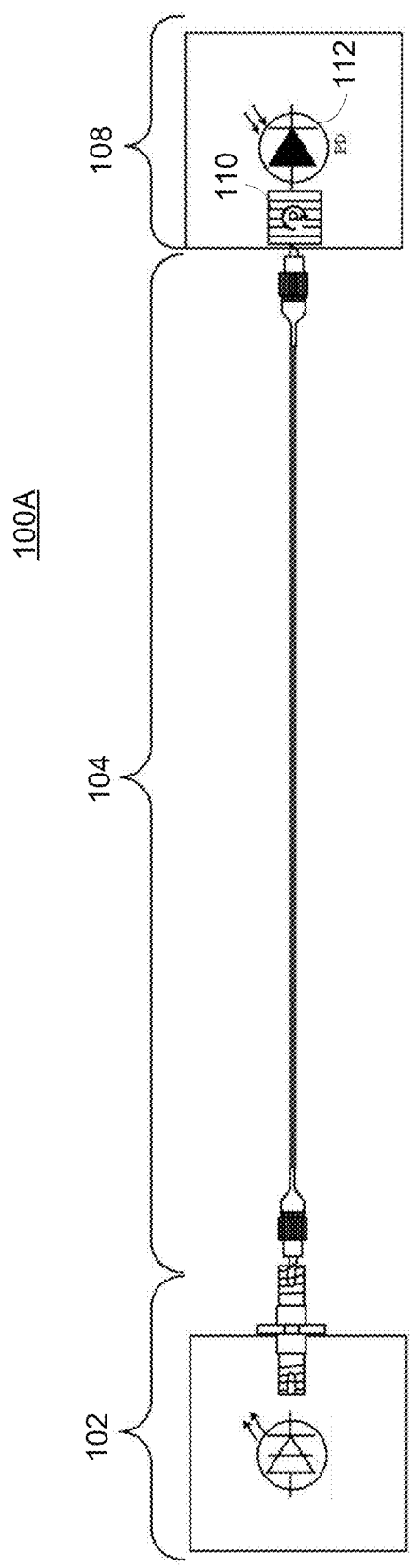
FIGS. 1A-1B illustrate a system for measuring polarization extinction ratio (PER) using a reference master test jumper (MTF), according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, polarization-dependent effects often have undesirable effects in fiber-optic systems. These adverse effects may include polarization-dependent loss (PDL) in various optical components and devices. These effects may arise, for example, in systems that variously measure a quantities maximum polarization-dependent variation, or alternatively, a quantities average value over all polarization states.

Polarization is a fundamental property of light and describes vibrations of a transverse optical wave. In classical physics, light is an electromagnetic wave. Polarization is defined in terms of pattern traced out in the transverse plane by the tip of an electric field vector as a function of time.

For unpolarized light the electric field vector, may fluctuate randomly in the transverse plane, along the direction of light beam propagation. Therefore, on average, no direction may be especially favored. The rate of the fluctuation may be so fast that a detector cannot discern state of polarization (SOP) at any instant of time. In such a state, the light may be effectively considered unpolarized. A light beam may generally be considered to consist of partially polarized or fully polarized light. Degree of polarization (DOP) is typically used to describe how much in the total light intensity is polarized. For totally polarized light, DOP may be one. On the other hand, for completely unpolarized light, DOP may be zero.

The polarization of light beams may play an important factor in high-speed optical communication network system design. Output light from most high-performance lasers used in long-haul optical communication systems may come from highly polarized light sources, and these components themselves may have polarization sensitive responses. As bit rate increases, fiber optic communication systems may become increasingly sensitive to polarization related impairments, which are usually sought to be minimized. Such impairments may include polarization mode dispersion (PMD) in optical fibers, polarization dependent loss (PDL) in passive optical components, polarization dependent modulation (PDM) in electro-optic modulators, polarization dependent gain (PDG) in optical amplifiers, polarization dependent center wavelength (PDW) in wavelength-division multiplexing (WDM) filters, polarization dependent response (PDR) in receivers, polarization dependent sensitivity (PDS) in sensors and coherent communication systems, polarization dependent coupling (PDC) in taps, combiners, multicore fibers, etc., and other adverse or related effects.

Polarization-maintaining (PM) fibers (PMF) may be input-pigtailed to any of these highly polarized light sources, or other high-speed modulators and polarization controllers or scramblers, in order to help achieve a deterministic SOP. However, PM fibers may not consistently maintain polarization across the distance of the fiber because of various factors. While polarizers or polarimeters may be used to help rectify or correct these polarization-related problems, in order to use these devices, it may be important to accurately measure PM fiber cross talk and hence obtain a measure of the polarization extinction ratio (PER).

A technical problem with measuring PER using a PMF connector (e.g., a PMF optical cable or jumper) is that a PMF connector may typically have an extinction ratio (ER) of 15-20 dB, or possibly worse. In other words, the PMF connector, which is used to help control and mitigate polarization-related issues, may itself have a PER that adversely affects accurate polarization-related measurements.

Accordingly, a system that uses a tunable laser source, together with a properly-initialized reference PMF test jumper, according to the examples set forth herein may be provided. By fine-tuning the wavelength using a reference PMF jumper, a polarization component that may have undesirably leaked may be minimized, which in turn may optimize the PER in the PM fiber for testing and measurement purposes. Furthermore, the systems and techniques described herein may also provide a low-loss, cost-effective way to resolve the technical problem associated with accurately measuring PER.

Figure 1B:
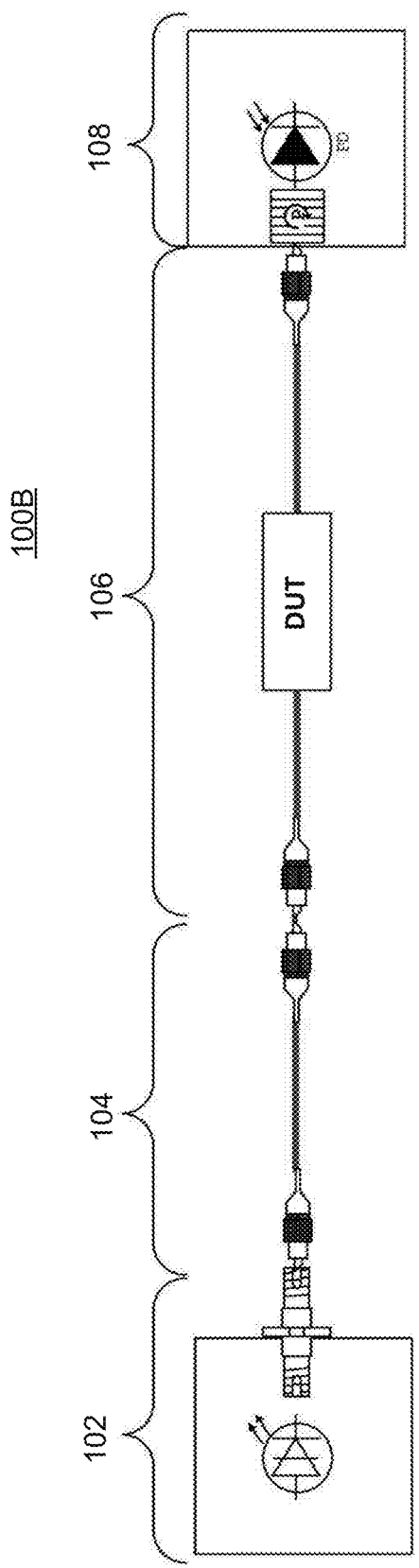

FIGS. 1A-1B illustrate a system for measuring polarization extinction ratio (PER) using a reference master test jumper (MTF), according to an example. As discussed above, PER measurement may be important for any type of qualification of polarization-maintaining (PM) components. In order to effectively measure PER, a reference master test jumper may be "created" or "initialized" (reference action) before measurement with a device under test (DUT) (measurement action). In this way, measurements from the reference action may be used to help isolate differences introduced by the DUT, which may thereby allow a more accurate measurement of the quantity of interest.

FIG. 1A illustrates a system 100A for measuring polarization extinction ratio (PER) using a reference master test jumper (MTF), according to an example. As shown, the system 100A may depict a setup or configuration for measurement during a reference action. For example, the system 100A may include an optical source 102, a reference master test jumper (MTJ) 104, and an optical measurement component 108. In some examples, the optical source 102 may be a tunable laser source. The tunable laser source may include a variable wavelength tuner. In some examples, the reference MTJ 104 may be a PM fiber MTJ (PMF-MTJ). In some examples, the optical measurement component 108 may include a polarizer 110 and a photodetector (PD) 112.

It should be appreciated that the terms PM fiber, PMF, PMF connector, optical fiber, jumper, jumper cable, master test jumper (MTJ), PM fiber MTJ (PMF-MTJ), reference jumper, reference MTJ, and jumper cable may be generally used in an interchangeable fashion throughout to refer to an optical fiber used for measurements described herein.

FIG. 1B illustrates a system 100B for measuring polarization extinction ratio (PER) using a reference master test jumper (MTF), according to an example. As shown, system 100B may depict a setup or configuration for measurement with a device under test during a measurement action. For example, the system 100B may include all the components or elements of system 100A, but system 100B may further include a device under test (DUT) 106. The DUT 106 may be any optical device connectable to the PMF-MTF 104 and the optical measurement component 108, as shown.

Figure 3:
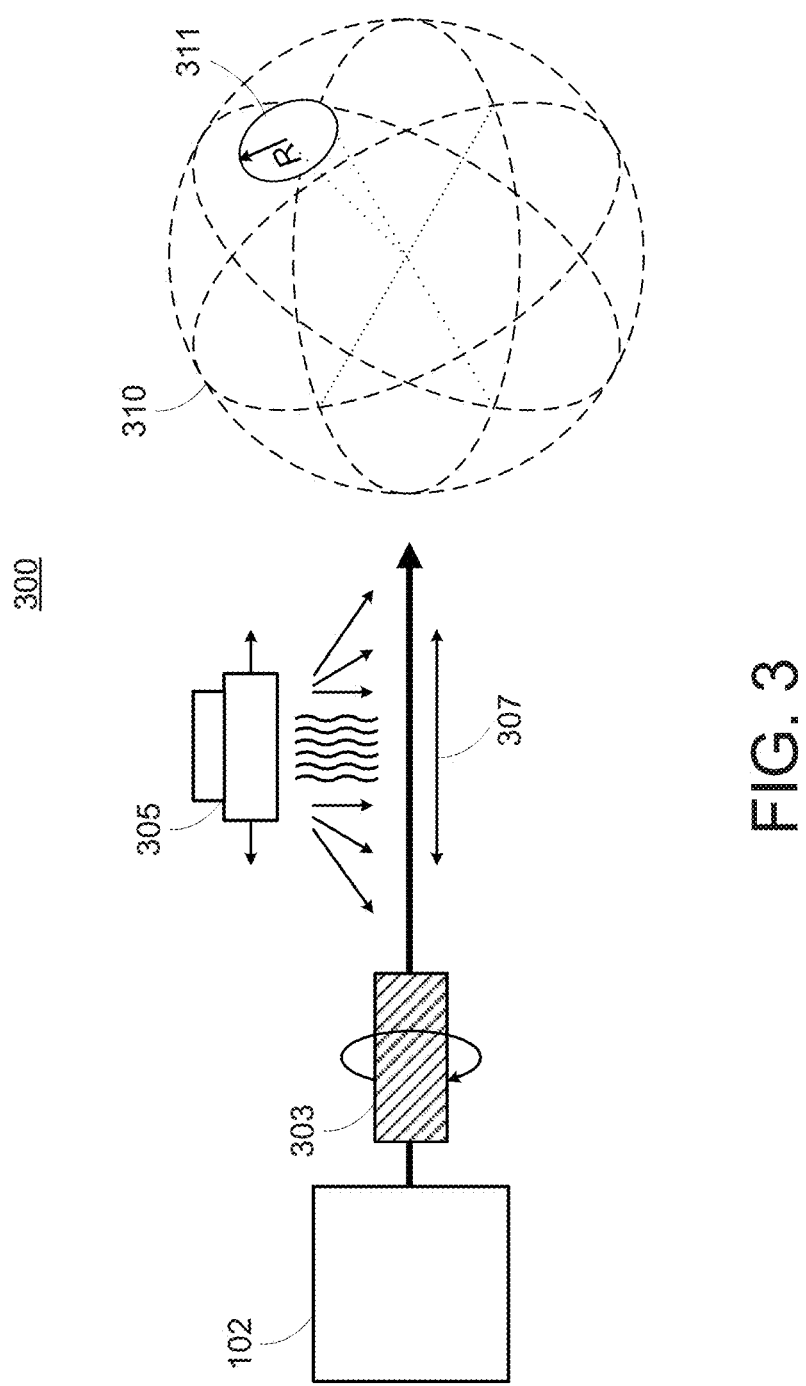
FIG. 3 illustrates a system for measuring polarization extinction ratio (PER) with a polarimeter display using a reference master test jumper (MTF), according to an example.

In order to measure PER, a polarizer may be used, as shown in FIGS. 1A-1B. In this case, the polarizer 110 in the optical measurement component 108 may be rotated in systems 100A and 100B to help facilitate measurements. Alternatively, a polarimeter may also be used to help measure PER, as shown in FIG. 3, which will be described in more detail below. Both scenarios may benefit from "creating" or "initializing" the reference MTJ 104 using the techniques described herein.

Figure 2A:
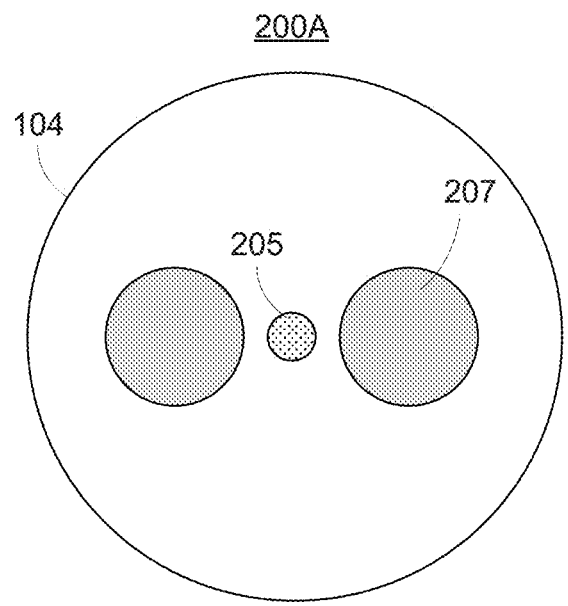
FIG. 2A-2B illustrate a polarization-maintaining (PM) fiber for measuring polarization extinction ratio (PER), according to an example.
Figure 2B:
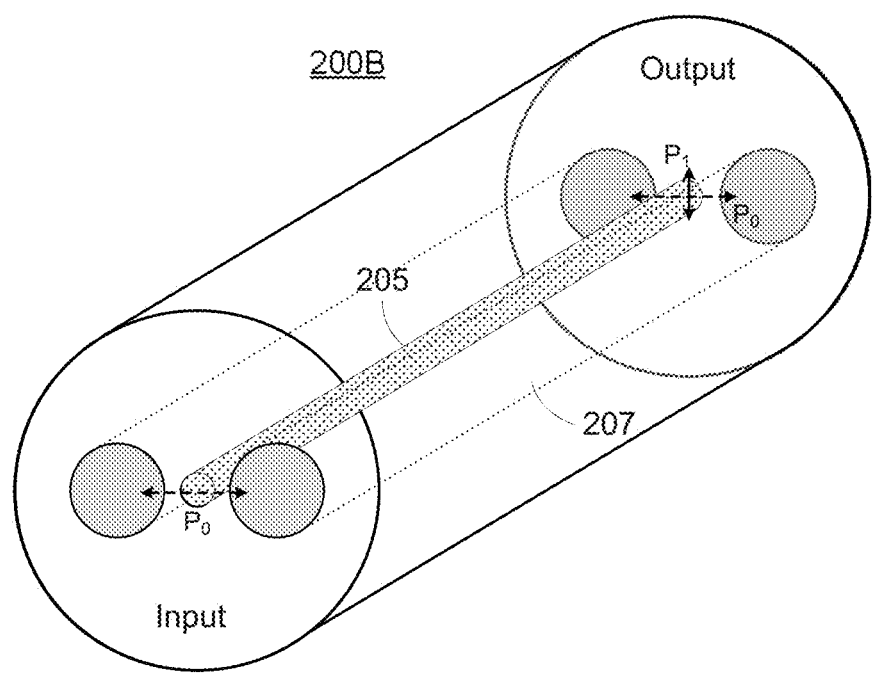

FIG. 2A-2B illustrate a polarization-maintaining (PM) fiber for measuring polarization extinction ratio (PER), according to an example. FIG. 2A illustrates a cross section 200A of a polarization-maintaining (PM) fiber (PMF) 104, according to an example. As shown in the cross section 200A, the PMF 104 may include a fiber core 205. There may also be regions of stress 207 on the fiber core 205 of the PMF 104. The stress 207 may be the result of thermal, mechanical, or other related strain.

FIG. 2B illustrates a planar view 200B of a polarization-maintaining (PM) fiber (PMF), according to an example. As shown, the stress 207 may impinge on the fiber core 205 of the PMF 104 and therefore affect polarization of light traveling in the fiber core 206. For example, an input of the PMF 104 may have a horizontal state of polarization (SOP) of $P_0$, as shown by the two-way horizontal arrow. However, because of the stress 207 (or launch-misalignment or other factors) on the fiber core 205, there may be an additional vertical state of polarization (SOP) of $P_1$ at an output of the PMF 104, as shown by the two-way vertical arrow.

As discussed above, in order to accurately and reliably measure PER in systems that use either a polarizer or a polarimeter, it may be important to first create a reference state with an extremely well aligned state-of-polarization (SOP) on the reference master-test-jumper (MTJ) 104, as depicted in FIGS. 1A-2B, that allows for the most accurate polarization-extinction ratio (PER) measurement possible. The "best" condition for measurement may be to have as much of the light possible in a single known linear state-of-polarization (SOP) at the output of the MTJ 104.

Referring to FIG. 2B, a single input SOP $P_0$ may be shown to give rise to both the $P_0$ and $P_1$ SOPs (corresponding to the two principle axes of the PM-fiber). Again, this may be problematic for accurate PER measurements. To have (or predominantly have) only the SOP $P_0$ at the output of the PMF 104 (and not the $P_1$ SOP) would correspond to an infinite PER, which in turn would produce the most ideal launch condition possible for performing any PER-related measurements.

To achieve these conditions, it should be appreciated that fine-tuning wavelength of optical source 102, as shown in FIGS. 1A-1B may be manipulated and configured to eliminate or minimize any adverse ER effects of the MTJ 104. According, a technique to measure PER under this scenario may be reflected in testing standard, International Organization for Standardization (ISO)/International Electrotechnical Commission (IEC) ISO/IEC 61300-3-ZZ/Ed1/WP, IEC:2016, which is incorporated in its entirety by reference.

Referring back to FIGS. 1A-1B, measurements may be provided in two actions: a reference action and a measurement action. The reference action may begin by creating a "reference" jumper. This may rely on an optical source that is PM-aligned to a PM fiber. In other words, the optical source 102 may be coupled to an input of a polarization-maintaining (PM) fiber 104. Once input light is coupled to the fiber 104, the light may be relayed to an output end of the PMF 104, and polarization of the light may be generally maintained by the PM-fiber optical properties.

As mentioned above, a polarization-maintaining fiber (PMF) 104 may have an extinction ratio of 15-20 dB, or possibly worse. Thus, when measurements are performed using this compromised PMF connector 104, any subsequent ER measurement of the DUT 106 using this PMF connector 104 may be likewise compromised. The result may be a degraded or inaccurate ER value.

In order to optimize the PER at the end of a PMF-MTJ 104, techniques to tune wavelength at the optical source 102 may be provided. Referring to FIG. 1A, a reference action for the jumper 104 may be provided. This may consist of measuring the ER (e.g., using a rotating polarizer 110), while the optical source 102 (e.g., tunable laser) is tuned to set the maximum PER.

Referring to FIG. 1B, the measurement action may then proceed as usual. In some examples, the measurement action may be performed using a center wavelength determined by the preceding (reference) action. It should be appreciated that several techniques may be used to search for a proper test wavelength. These techniques may include, but not limited to, the following: (1) bisecting to the optimum; (2) performing a continuously scan; or (3) performing a gradient ascent to the optimum. Each of these techniques will be described in more detail below. It should be appreciated that at for each wavelength, the PER measurement may be observed or determined as the polarizer (in a rotating-polarizer scenario) may be rotated through 180-degrees. This process may continue until the largest PER is determined and the proposed measurement condition would be performed.

The measurement techniques described herein not only benefit a rotating polarizer scenario, as depicted in FIGS. 1A and 1B, but also in systems using a polarimeter. For example, FIG. 3 illustrates a system 300 for measuring polarization extinction ratio (PER) with a polarimeter display using a reference master test jumper (MTF), according to an example. As shown, optical source 102 may transmit light through an optical fiber to a polarimeter display 310. The polarimeter display 310 may also be referred to as a Poincare sphere, which may include a polarization trace 311. The polarization trace 310 may represent polarization crosstalk. It should be appreciated that the optical source 102, which may be a tunable laser source, as described herein, may effectively tune the light source passing through the fiber in a way similar to other thermal or mechanical techniques, such as using a rotatable fiber sleeve 303, a heater 305 to apply heat, or a mechanical stretching 307 of the fiber. By tuning the optical source 102, there may not be a need to apply any number of thermal (heat) or mechanical (rotation or stretching) actions on the fiber. As a result, this may result in a more efficient, simpler, and more reliable option for creating initializing the reference MTJ cable.

As mentioned above, there may be numerous ways to configure the optical source 102 (laser source) and the optical measurement component 108, including the (rotating) polarizer 110 and the photodetector 112. In some examples, the MTJ-PER may be maximized. In other examples, a prescribed, pre-determined MTJ-PER may be set. It should be appreciated that using a pre-determined MTJ-PER tuning-technique, as described herein, may be achieved without thermal and/or mechanical factors as mentioned, resulting in a more efficient and reliable method.

As discussed above, there may be several techniques to search for a proper test wavelength for initializing the MTJ. These techniques may include, but not limited to, the following: (1) performing a continuous scan; (2) performing a gradient ascent to the optimum; and/or (3) applying a deterministic approach (bisecting to the optimum). It should be appreciated that (1) performing a continuously scan and (2) performing a gradient ascent to the optimum may be used in scenarios where a polarizer-type device may be required to be rotated continuously, and (3) applying a deterministic approach (bisecting to the optimum) may be used in scenarios where the polarizer may be set explicitly to a target angle θ. Other various techniques and variations may also be provided.

For (1) performing a continuously scan, the technique may involve using a scanning laser approach. For example, this may begin with setting a laser frequency, v1. Once this is done, a polarizer angle versus optical power throughput may be measured, as represented by the expression below:

$$PER_1 = P_{max} - P_{min}.$$

Figure 4:
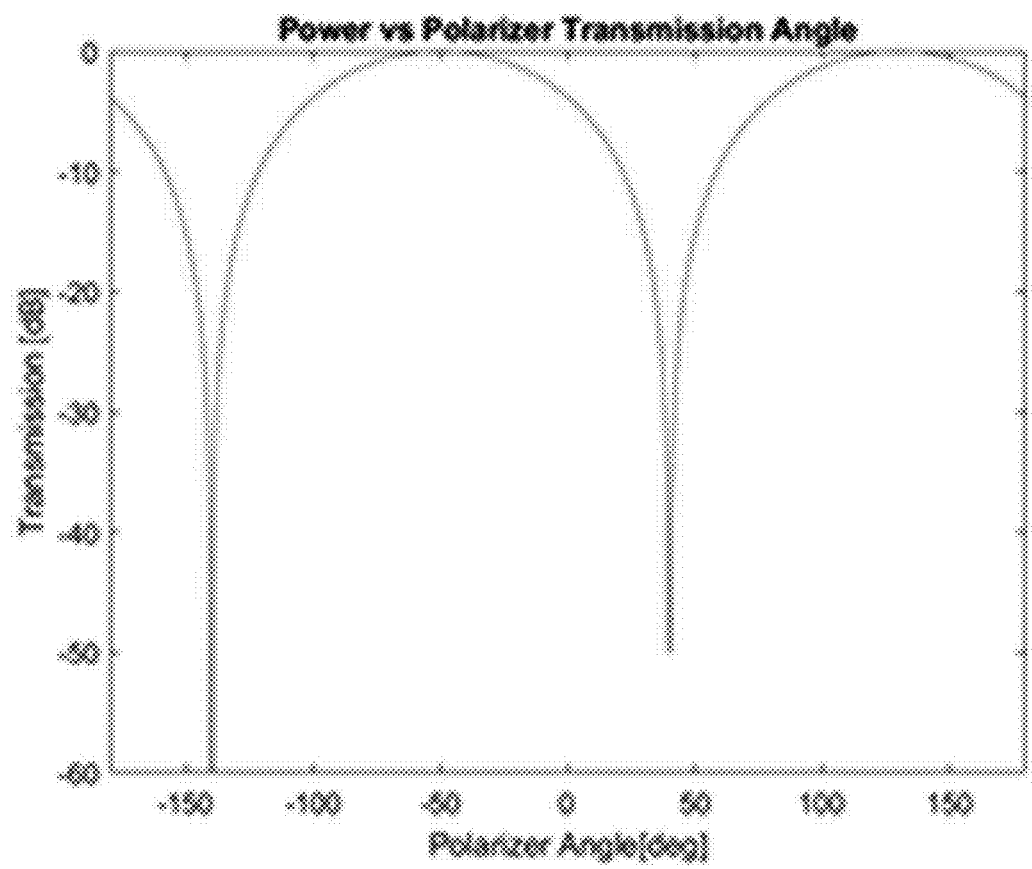
FIG. 4 illustrates a graph of polarization extinction ratio (PER) measurements using a reference master test jumper (MTF), according to an example.

FIG. 4 illustrates a graph 400 of polarization extinction ratio (PER) measurements using a reference master test jumper (MTF), according to an example. As shown, the graph 400 depicts power versus polarizer transmission angle. Here, a maximum and minimum traced may be observed and traced out in curved region, where PER is a difference between the maximum and the minimum. It should be appreciated that different PER may be observed at different laser frequencies, as null location and depth may vary with laser frequency.

Once polarizer angle versus optical power throughput is measured, a laser frequency may be detuned. For example, the laser frequency may be detuned to:

$$v2 = v1 + \Delta v.$$

The technique may continue by repeating measuring polarizer angle versus optical power throughput, and thereby obtain:

$$PER_2 = P_{max} - P_{min}.$$

It should be appreciated that $PER_2$ may be different from $PER_1$.

These actions may be repeated for a wide range of laser frequencies. For example, these actions may be performed and repeated until the optimum PER is measured and determined.

For (2) performing a gradient ascent, the technique may similar to (1) above, but instead of systematically rotating the polarizer, and stepping and scanning the laser frequency, another approach may be used to arrive at an optimum laser frequency. The technique may begin with a baseline measurement. For example, at current laser frequency, v1, the polarizer may be scanned and PER may be noted: $PER_1 = P_{max} - P_{min}$.

A test measurement at laser frequency, $v2 = v1 + \Delta v$, and measurement, $PER_1 = P_{max} - P_{min}$, may be obtained. It should be appreciated that if $PER_2 > PER_1$, this may suggest or imply the laser frequency may continue to be detuned in the $v_{n+1} = v_n + \Delta v$ direction.

However, if or when that $PER_n < PER_{n+1}$, it may be clear that the frequency has gone too far, and the laser frequency may be detuned in the other direction (e.g., in the $v_{n+1} = v_n \Delta v$ direction). In this way, the technique may begin with large Δv actions in the beginning and converge quickly always bisecting to the maximum PER (in a "gradient" fashion).

For (3) applying a deterministic approach (bisecting to the optimum), the technique may begin with finding a maximum polarizer azimuthal angle θ1. It should be appreciated that this maximum may be wavelength insensitive and may apply to all laser frequencies. It is the null that varies strongly with laser frequency.

The technique may continue by flipping the polarizer 110 azimuthal angle θ2=θ+90 degrees (e.g., orthogonal to the maximum). Once this is achieved, a scanning technique according to (1) or a gradient ascent technique according to (2) may be performed on the laser frequency at a polarizer azimuth.

While examples described herein are directed to configurations as shown, it should be appreciated that any of the components described herein may be altered, changed, replaced, or modified, in size, shape, and numbers, or material, depending on application or use case, and adjusted for desired or optimal PER measurement results.

FIG. 5 illustrates a flow chart of a method for measuring polarization extinction ratio (PER) using a reference master test jumper (MTF), according to an example. The method 500 is provided by way of example, as there may be a variety of ways to carry out the method described herein. Although the method 600 is primarily described as being performed by the systems in configurations 100A-100B and 300 of FIGS. 1A-1B and/or 3, respectively, the method 500 may be executed or otherwise performed by one or more processing components of another system or a combination of systems. Each block shown in FIG. 5 may further represent one or more processes, methods, or subroutines, and one or more of the blocks may include machine readable instructions stored on a non-transitory computer readable medium and executed by a processor or other type of processing circuit to perform one or more operations described herein.

At block 501, an optical fiber 104 input may be communicatively coupled to an optical source 102 that transmits a first optical signal to the optical fiber input optical fiber 104 input. In some examples, the optical source 102 may be a tunable laser source, and the optical fiber 104 may be a polarization-maintaining (PM) fiber.

At block 502, an optical fiber 104 output may be communicatively coupled to an optical measurement component 108. The optical measurement component 108 may measure an extinction ratio (ER) of the optical fiber 104. In some examples, the optical measurement component 108 may include a polarizer 110 (or a polarimeter) and a photodetector 112. The polarizer 110 and/or the polarimeter may help facilitate polarization extinction ratio (PER) measurements at the optical measurement component 112.

At block 503, the optical source 102 may be tuned using a tuning technique based on the measured extinction ratio (ER) of the optical fiber 104. Once the optical source 102 is tuned, the optical fiber 104 may be configured to be a reference master test jumper (MTJ). As described herein, the optical source 102 may be tuned using a tuning technique that tunes the optical source 102 based on the extinction ratio (ER) measured in the optical fiber. In some examples, the tuning technique may be a scanning laser technique, a gradient ascent, a deterministic technique, or other technique.

At block 504, a device under test (DUT) 106 may be communicatively coupled to the optical fiber 104 output and the optical measurement component 108. In this way, when the tuned optical source 102 transmits a second optical signal via the optical fiber 104 input and the device under test (DUT) 106 to be received at the optical measurement component 108.

At block 505, the optical measurement component may measure a polarization extinction ratio (PER) of the second optical signal. Because of the initial tuning of the optical source using an initialized reference MTJ, the measured PER of the second optical signal may have reduce or minimized ER effects.

It should be appreciated that the systems and methods described herein may facilitate more reliable and accurate PER measurements. It should also be appreciated that the systems and methods, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the PER/ER measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to test and measurement systems, it should be appreciated that the systems and methods described herein may also be used in other various systems and other implementations. For example, there may be numerous applications in optical communication networks and fiber sensor systems that could employ the systems and methods as well.

It should be appreciated that the systems and methods described herein may also be used to help provide, directly or indirectly, measurements for distance, angle, rotation, speed, position, wavelength, transmissivity, and other related optical measurements. For example, optimizing the PER at the end of the PMF-MTJ may provide a more accurate measure of the PER of the DUT. The most accurate measure may generally be the largest measurement, and hence a demonstration of the best possible PER specification for a user's DUT. The uncertainty of a PER measurement may be decreased as a result of various thermal or mechanical manipulation performed on the fiber rather than creating a reference jumper using the tuning techniques described herein. Minimizing these errors and inconsistencies may increase reliability of PER measurements.

It should also be appreciated that the systems and methods described herein may not only maximize of the polarization extinction ratio, but also create a configurable polarization extinction ratio. For example, using a micro-tuning technique similar to those described here, a prescribed PER=XdB may be used to emulate any specific system or environment desired. This may provide added customization and flexibility to any device under test.

With additional advantages that include low insertion loss, low back reflection, low residual amplitude and phase modulation, low wavelength and temperature sensitivity, low cost, and small form factor, the systems and methods described herein may be beneficial in many original equipment manufacturer (OEM) applications, where they may be readily integrated into various and existing network equipment, fiber sensor systems, test and measurement instruments, or other systems and methods. The systems and methods described herein may provide mechanical simplicity and adaptability to small or large optical beams. Ultimately, the systems and methods described herein may increase control and modulation, and improve measurement efficiencies.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
    an optical source to transmit an optical signal via an optical fiber;
    a device under test (DUT) communicatively coupled to the optical source via the optical fiber to receive the optical signal from the optical source; and
    an optical measurement component communicatively coupled to the device under test (DUT);
    wherein the optical source is tuned by using a reference master test jumper (MTJ) to minimize inherent polarization extinction ratio (PER) of the optical fiber.

2. The system of claim 1, wherein the optical source is tuned using a tuning technique based on the polarization extinction ratio (PER) measured in the optical fiber.

3. The system of claim 1, wherein the optical fiber is a polarization-maintaining (PM) fiber.

4. The system of claim 1, wherein the optical measurement component comprises a photodetector and at least one of a polarizer or a polarimeter.

5. The system of claim 4, wherein the at least one of the polarizer or the polarimeter facilitates polarization extinction ratio (PER) measurements at the optical measurement component.

6. The system of claim 1, wherein the optical fiber is configured to be a reference master test jumper (MTJ) using a tuning technique that tunes the optical source based on the polarization extinction ratio (PER) measured in the optical fiber.

7. The system of claim 6, wherein the tuning technique tunes the optical source based on at least one of a scanning laser technique, a gradient ascent, and a deterministic technique.

8. A method of initializing a reference master test jumper (MTJ) for measuring polarization extinction ratio (PER), comprising:
    performing a reference action, comprising:
        communicatively coupling an optical fiber input to an optical source that transmits a first optical signal to the optical fiber input;
        communicatively coupling an optical fiber output to an optical measurement component to measure a polarization extinction ratio (PER) of the optical fiber; and
        tuning the optical source based on the measured polarization extinction ratio (PER) of the optical fiber; and
    performing a measurement action, comprising:
        communicatively coupling the optical fiber input to the tuned optical source that transmits a second optical signal to the optical fiber input; and
        communicatively coupling a device under test (DUT) to the optical fiber output and to the optical measurement component;
        wherein the measurement action measures a polarization extinction ratio (PER) of the second optical signal at the optical measurement component.

9. The method of claim 8, wherein the optical source is a tunable laser source.

10. The method of claim 8, wherein the optical fiber is a polarization-maintaining (PM) fiber.

11. The method of claim 8, wherein the optical measurement component comprises a photodetector and at least one of a polarizer or a polarimeter.

12. The method of claim 11, wherein the at least one of the polarizer or the polarimeter facilitates polarization extinction ratio (PER) measurements at the optical measurement component.

13. The method of claim 8, wherein the optical fiber, after the reference action, is configured to be a reference master test jumper (MTJ).

14. The method of claim 8, wherein the optical source is tuned using a tuning technique that tunes the optical source based on the polarization extinction ratio (PER) measured in the optical fiber, the tuning technique based on at least one of a scanning laser technique, a gradient ascent, or a deterministic technique.

15. A non-transitory computer-readable storage medium having an executable stored thereon, which when executed instructs a processor to perform a method as follows:
    performing a reference action, comprising:
        communicatively coupling an optical fiber input to an optical source that transmits a first optical signal to the optical fiber input;
        communicatively coupling an optical fiber output to an optical measurement component to measure a polarization extinction ratio (PER) of the optical fiber; and
        tuning the optical source based on the measured polarization extinction ratio (PER) of the optical fiber; and
    performing a measurement action, comprising:
        communicatively coupling the optical fiber input to the tuned optical source that transmits a second optical signal to the optical fiber input;
        communicatively coupling a device under test (DUT) to the optical fiber output and to the optical measurement component to measure a polarization extinction ratio (PER) of the second optical signal.

16. The non-transitory computer-readable storage medium of claim 15, wherein the optical source is a tunable laser source, and the optical fiber is a polarization-maintaining (PM) fiber.

17. The non-transitory computer-readable storage medium of claim 15, wherein the optical measurement component comprises a photodetector and at least one of a polarizer or a polarimeter.

18. The non-transitory computer-readable storage medium of claim 17, wherein the at least one of the polarizer or the polarimeter facilitates polarization extinction ratio (PER) measurements at the optical measurement component.

19. The non-transitory computer-readable storage medium of claim 15, wherein the optical fiber, after the reference action, is configured to be a reference master test jumper (MTJ).

20. The non-transitory computer-readable storage medium of claim 15, wherein the optical source is tuned using a tuning technique that tunes the optical source based on the polarization extinction ratio (PER) measured in the optical fiber, the tuning technique based on at least one of a scanning laser technique, a gradient ascent, or a deterministic technique.

\* \* \* \* \*